United States Patent [19]

Hane

[11] Patent Number: 5,239,581
[45] Date of Patent: Aug. 24, 1993

[54] SECRET COMMUNICATION APPARATUS
[75] Inventor: Toshihisa Hane, Hyogo, Japan
[73] Assignee: Mitsubishi Denki Kabushiki Kaisha, Tokyo, Japan
[21] Appl. No.: 912,748
[22] Filed: Jul. 13, 1992
[30] Foreign Application Priority Data Jul. 15, 1991 [JP] Japan .................................. 3-198336

[51] Int. Cl.⁵ .................................................. G11B 1/00
[52] U.S. Cl. ........................................ 380/3; 380/52; 310/71; 439/189; 364/240.8
[58] Field of Search ....................... 380/3, 52; 310/71; 439/189; 364/240.8

[56]                     References Cited
                    U.S. PATENT DOCUMENTS 4,972,470  11/1990  Farago ..................................... 380/3

FOREIGN PATENT DOCUMENTS 60-139049  7/1985  Japan .

Primary Examiner—David Cain
Attorney, Agent, or Firm—Rothwell, Figg, Ernst & Kurz

[57]                       ABSTRACT

This secret communication apparatus used in an audio and data transmission system has scramble/descramble circuits formed of programmable logic means. A control circuit in the apparatus instructs the programmable logic means to alter the arrangement of scramble/descramble circuits in accordance with the control signal received from the partner of communication. The control circuit in the partner's apparatus also instructs its programmable logic means to alter the arrangement of scramble/descramble circuits.

5 Claims, 6 Drawing Sheets

PROGRAMMABLE LOGIC MEANS

SECRET COMMUNICATION APPARATUS

BACKGROUND OF THE INVENTION

1. Field of the Invention

The present invention relates to a transmission apparatus which is equipped in wire transmission apparatus used in an optical subscriber transmission system or the like and adapted to send and receive audio information or the like through the encryption/decryption processes.

2. Description of the Prior Art

FIG. 1 is a block diagram showing the transmission system which includes a transmission apparatus equipped with a conventional secret communication apparatus. In the figure, symbols 1a through 1n denote network terminating equipments installed on the part of subscribers, 2 is a terminal equipment installed on the part of an exchange office, and 3 is an optical fiber transmission line which connects the network terminating equipments 1a-1n to the terminal equipment 2 in the form of passive double star (PDS) system in which a single optical fiber cable is branched midway into a plurality of subscriber's lines.

Each of the network terminating equipments 1a-1n incorporates a transmission path interface circuit 11 which performs conversion between the optical signal transmitted over the optical fiber transmission line 3 and the electrical signal processed inside the network terminating equipment, 12 is a scrambler which encrypts outgoing data and transfers the resulting data to the interface circuit 11, and 13 is a descrambler which decrypts incoming data received by the interface circuit 11 thereby to restore the original data. The terminal equipment 2 incorporates a transmission path interface circuit 21 which is similar to the interface circuit 11 used in the network terminating equipment, 22 is a scrambler similar to the one 12, and 23 is a descrambler similar to the one 13.

Next, the operation will be explained. The optical subscriber transmission system shown in FIG. 1 employs the PDS cable system, and therefore the same optical signal is delivered to all subscriber's network terminating equipments 1a-1n. On this account, the network terminating equipments 1a-1n and terminal equipment 2 not only perform signal separation based on time slots, but they perform data encryption and decryption by means of the scramblers 12 and 22 and descramblers 13 and 23 thereby to prevent the leakage of communication data from one subscriber to another.

Transmission data to be sent from the subscriber is fed to the scrambler 12 in the subscriber's network terminating equipment so that it is encrypted, and the encrypted data is fed to the transmission path interface circuit 11. The interface circuit 11 converts the encrypted electrical transmission data into an optical signal, and sends the signal over the optical fiber transmission line 3. In the exchange office, the signal is received by the transmission path interface circuit 21 in the terminal equipment 2, by which the optical signal is converted to an electrical signal and fed to the descrambler 23. The descrambler 23 decrypts the received data thereby to restore the original data.

Data to be sent from the exchange office to a subscriber is encrypted by the scrambler 22 in the terminal equipment 2 and, after transmission, the received data is decrypted by the descrambler 13 in the network terminating equipment of the subscriber so that the original data is restored, in the same manner as mentioned above.

However, the conventional secret communication apparatus described above is deficient in that if the scrambling scheme used for the scramblers and descramblers in the system is known by the third party, transmitted messages can easily be exposed and transmitted data can easily be analyzed by the third party.

SUMMARY OF THE INVENTION

The present invention is intended to overcome the foregoing prior art deficiency, and its prime object is to provide a secret communication apparatus capable of surely preventing the leakage of transmitted messages and data to the third party.

According to one aspect of this invention, the secret communication apparatus is designed to configure a set of scramble/descramble circuits of variable type in the form of programmable logic means and have a control circuit which instructs the logic means to alter the scramble/descramble circuits in accordance with circuit data sent from the partner of communication.

According to another aspect of this invention, the secret communication apparatus is designed to configure a set of scramble/descramble circuits of variable type in the form of programmable logic means and have a control circuit which instructs the logic means to alter the scramble/descramble circuits in accordance with circuit data imparted by an external device.

According to still another aspect of this invention, the secret communication apparatus is designed to configure a set of scramble/descramble circuits of variable type in the form of programmable logic means and have a control circuit which instructs the logic means to alter the scramble/descramble circuits in accordance with circuit data held inside the self communication apparatus.

The control circuit based on this invention operates on the programmable logic means to alter the scramble/descramble circuits at a prescribed time interval in accordance with circuit data received from the partner of communication, or circuit data imparted by an external device, or circuit data held inside the communication apparatus, thereby surely preventing the leakage of communication to the third party.

DETAILED DESCRIPTION OF THE PREFERRED EMBODIMENTS

Embodiments of the present invention will be described with reference to the drawings.

Figure 1:
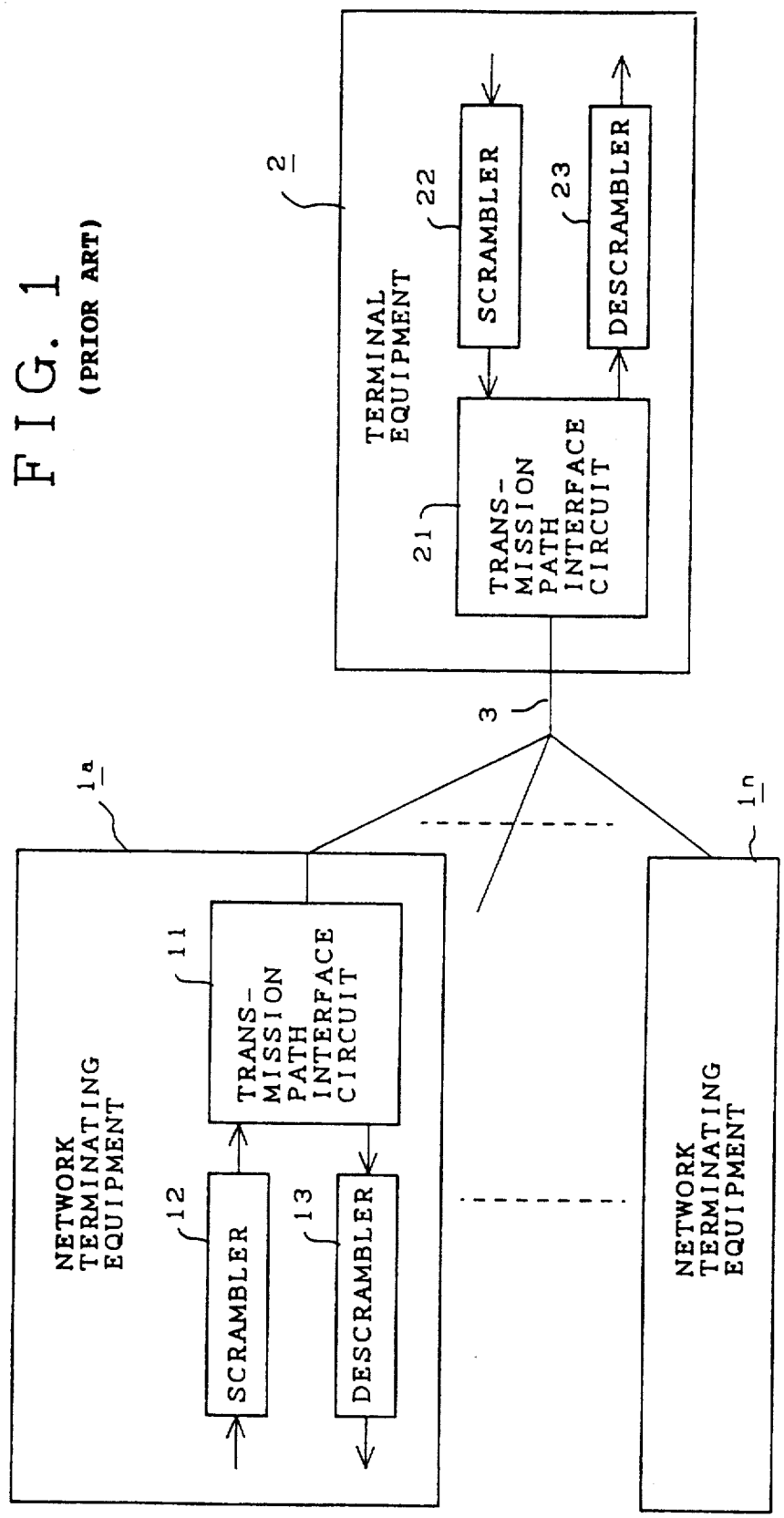
FIG. 1 is a block diagram showing a transmission system which includes a conventional secret communication apparatus.
Figure 2:
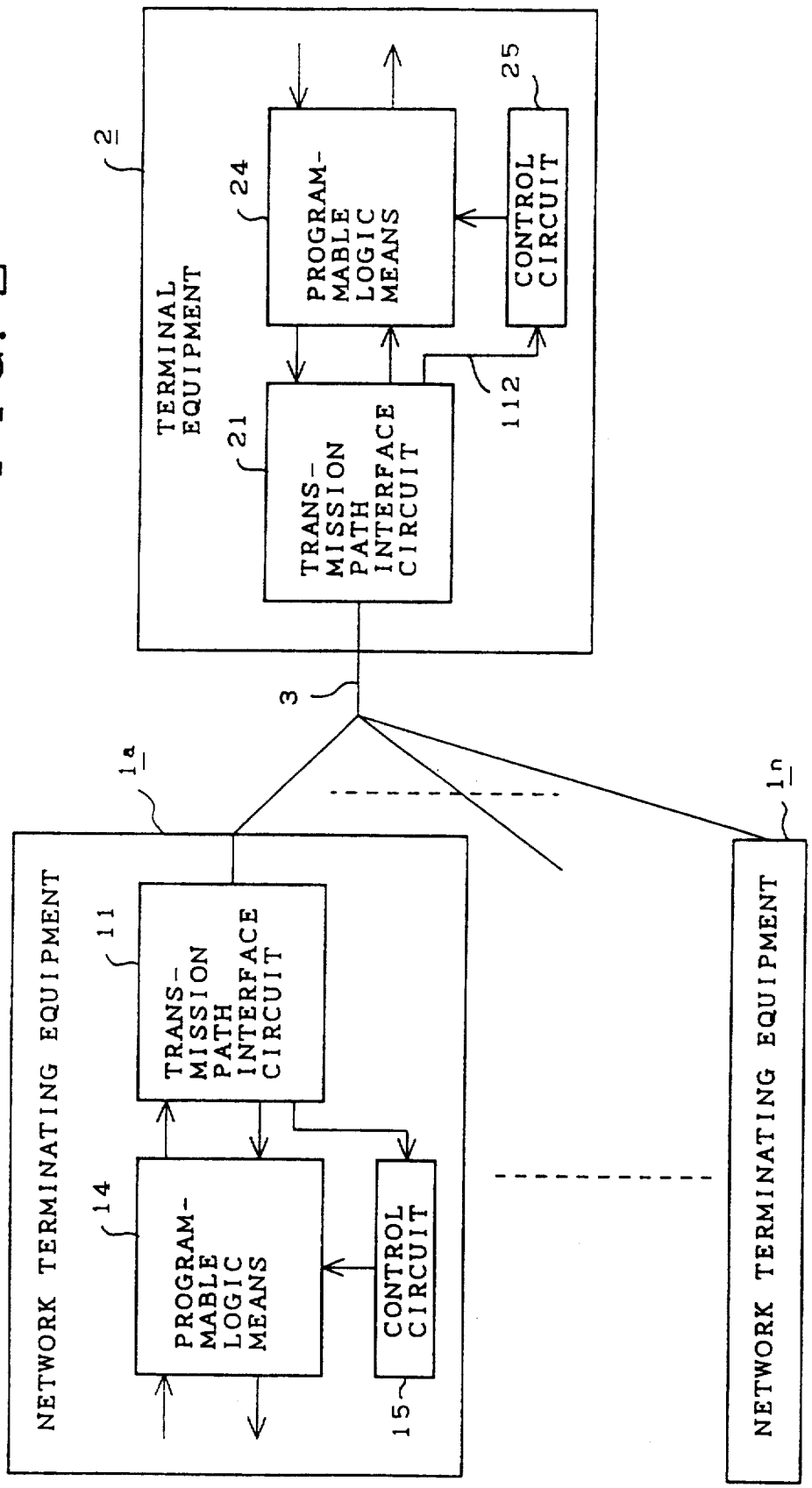
FIG. 2 is a block diagram showing the transmission system which includes the secret communication apparatus based on an embodiment of this invention.

FIG. 2 is a block diagram showing the transmission system which is equipped with the secret communication apparatus based on an embodiment of this invention. In the figure, symbols 1a through 1n denote network terminating equipments, 2 is a terminal equipment, 3 is an optical fiber transmission line, and 11 and 21 are transmission path interface circuits of PDS system, with all functional blocks identical or equivalent to those of FIG. 1 are referred to by the common symbols.

Indicated by 14 and 24 are programmable logic means which configure scramble/descramble circuits for encrypting transmission data and decrypting reception data thereby to restore original data in a manner determined by control signals provided in a certain manner. Indicated by 15 and 25 are control circuits which produce the control signals, which are to be supplied to the programmable logic means 14 and 24 for the alteration of the scramble/descramble circuits, based on data received from the partner of communication.

Figure 3:
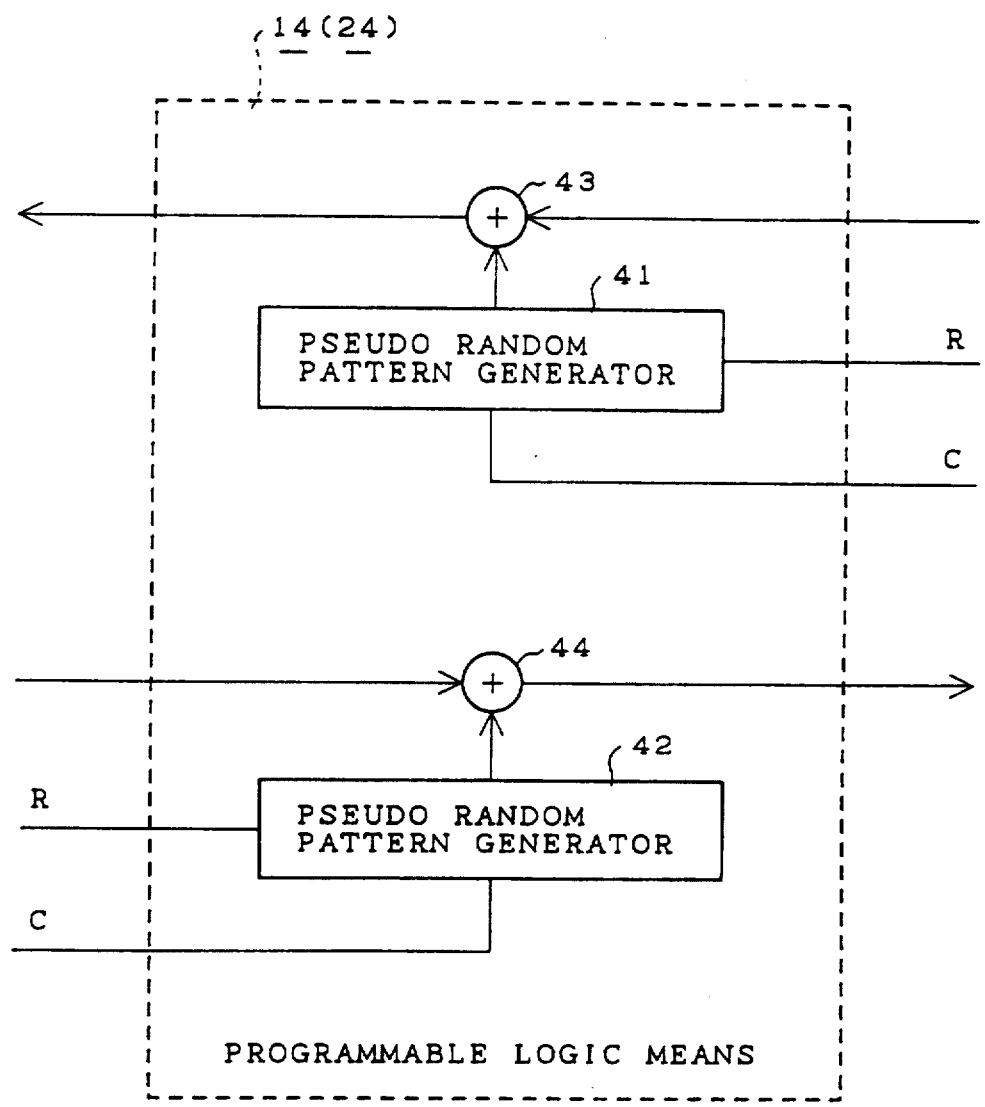
FIG. 3 is a block diagram showing an example of the scramble/descramble circuits configured in the form of programmable logic means.
Figure 4:
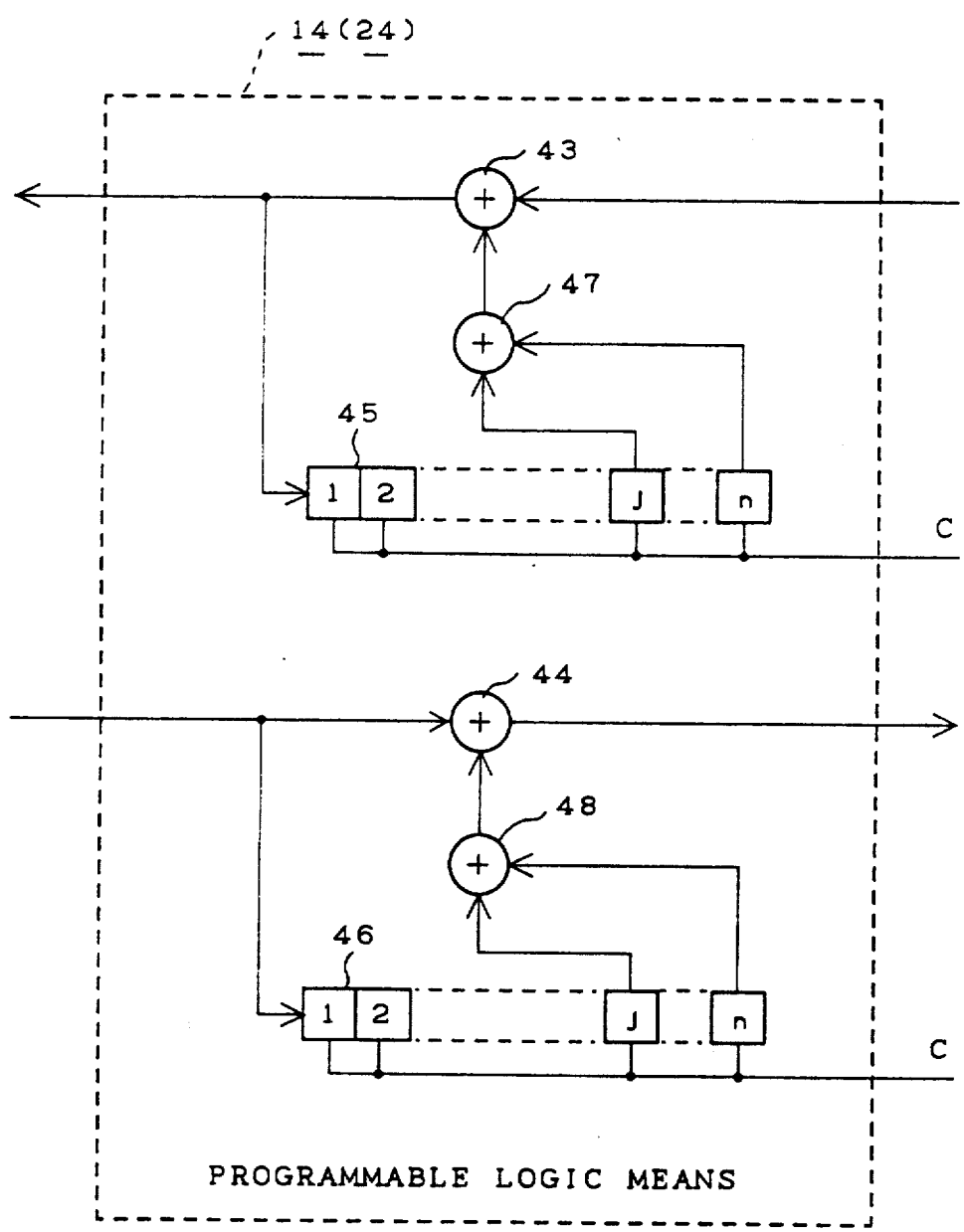
FIG. 4 is a block diagram showing another example of the scramble/descramble circuits configured in the form of programmable logic means.

FIG. 3 and FIG. 4 are block diagrams showing examples of the scramble/descramble circuits configured by the programmable logic means 14 and 24. Shown in FIG. 3 is an example of the scrambler/descrambler using a pseudo random pattern, and shown in FIG. 4 is an example of the scrambler/descrambler of self-synchronization type.

In FIG. 3, indicated by 41 and 42 are pseudo random pattern generator which generates a pseudo random pattern by being controlled by the clock signal C and reset signal R. 43 is an exclusive-OR gate which takes the exclusive logical sum between the transmission data and the pseudo random pattern provided by the pseudo random pattern generator 41 thereby to encrypt the transmission data. 44 is an exclusive-OR gate which takes the exclusive logical sum between the reception data and the pseudo random pattern provided by the pseudo random pattern generator 42 thereby to decrypt the reception data and restore the original data.

In FIG. 4, indicated by 45 is a shift register which shifts the transmission data in response to the clock signal C, and 46 is a shift register which shifts the reception data in response to the clock signal C. is an exclusive-OR gate which takes the exclusive logical sum between bit j and bit n of the shift register 45 and supplies the result to the exclusive-OR 43 of encryption, and 48 is an exclusive-OR gate which takes the exclusive logical sum between bit j and bit n of the shift register 46 and supplies the result to the exclusive-OR 44 of decryption.

The programmable logic means 14 and 24 are designed to form a set of scramble/descramble circuits of arbitrary one of multiple kinds, including the ones shown in FIGS. 3 and 4, in response to the control signals provided by the control circuits 15 and 25.

Next, the operation will be explained. Transmission data sent by the subscriber is fed to the programmable logic means 14 in the network terminating equipment and the data is encrypted by the scramble/descramble circuit formed by the logic means as shown in FIG. 3 or 4 for example. The encrypted electrical transmission data is converted into an optical signal by the transmission path interface circuit 11 and thereafter sent over the optical fiber transmission line 3. The exchange office receives the optical signal, and it is converted into an electrical signal by the transmission path interface circuit 21 in the terminal equipment 2. The signal is transferred to the programmable logic means 24, and the scramble/descramble circuit formed by the logic means decrypts the data thereby to restore the original data.

Data sent from the exchange office to a subscriber is treated in the same manner, in which the data is encrypted by the scramble/descramble circuit formed by the programmable logic means 24 in the terminal equipment 2, and the received data is decrypted by the scramble/descramble circuit formed by the programmable logic means 14 in the network terminating equipment so that the original data is restored.

The scramble/descramble circuits 15 and 25 formed by the programmable logic means 14 and 24 are altered by the control signals provided by the control circuits 15 and 25. The control signals are produced by the control circuits 15 and 25 based on circuit data which is sent from the partner of communication over the optical fiber transmission line 3 and separated by the transmission path interface circuits 11 and 21. Alteration of scramble/descramble circuits is prompted by the control signal issuing party at the occurrence of a certain event, e.g., at the transmission of certain data or on expiration of a prescribed time. For the control signal issuing party, the control circuit 25 or 15 instructs the alteration of programmable logic means 24 or 14 of the self equipment. It is possible for any of the network terminating equipments 1a-1n and terminal equipment 2 to generate the control signal.

It is not always necessary for the system to have the same scramble/descramble circuits for encrypting and decrypting data sent from the network terminating equipments 1a-1n to the terminal equipment 2 and for encrypting and decrypting data sent from the terminal equipment 2 to the network terminating equipments 1a-1n, but instead different scramble/descramble circuits may be formed by the programmable logic means 14 and 24 for individual directions of communication.

Based on the arrangement in which the control circuits 15 and 25 instruct the programmable logic means through the control signals to form scramble/descramble circuits of one of multiple types, as shown in FIG. 3 and FIG. 4, the logical encryption function can be altered when necessary so that it is virtually impossible for the third party to know the logical mechanism of encryption, whereby the leakage of communication can surely be prevented.

Figure 5:
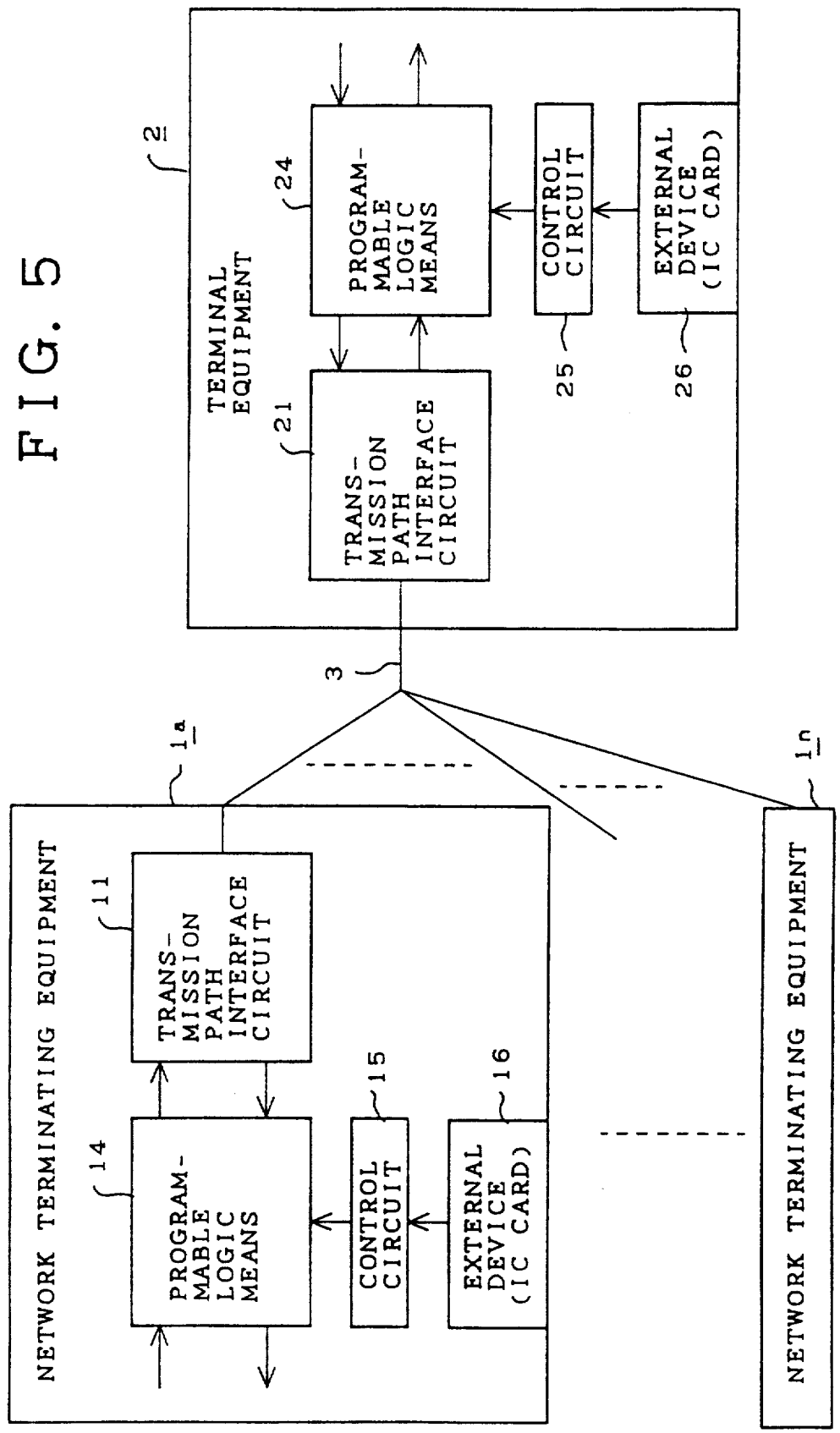
FIG. 5 is a block diagram showing the transmission system which includes the secret communication apparatus based on another embodiment of this invention.

FIG. 5 is a block diagram showing another embodiment of this invention. In the figure, indicated by 16 and 26 are IC cards which serve as external devices for provided circuit data for the control circuits 15 and 25. Accordingly, the control circuits 15 and 25 instruct the programmable logic means 14 and 24 to alter the scramble/descramble circuits in accordance with the circuit data recorded on the IC cards 16 and 26.

Next, the operation will be explained. The control circuits 15 and 25 read circuit data out of the IC cards 16 and 26, respectively, produces control signals based on the circuit data, and supplies the signals to the programmable logic means 14 and 24. The programmable logic means 14 and 24 form scramble/descramble circuits in correspondence to the control signals. The subsequent operation is identical to the previous embodiment shown in FIG. 2.

Circuit data may be entered to the control circuits 15 and 25 from other external devices, instead of using the IC cards 16 and 26 as explained in the previous embodiment, and the same effectiveness as of the above embodiment will be achieved.

Figure 6:
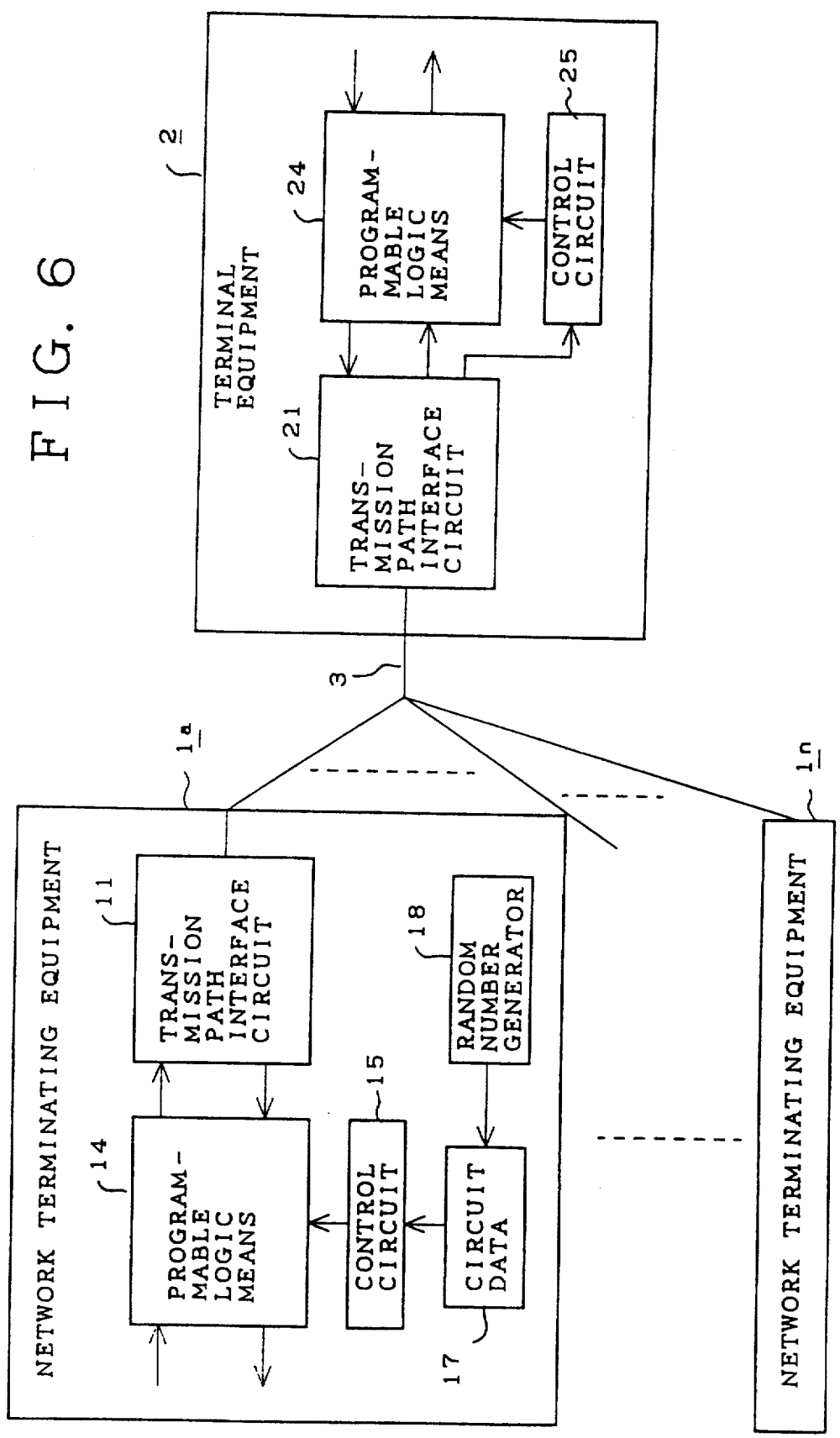
FIG. 6 is a block diagram showing the transmission system which includes the secret communication apparatus based on still another embodiment of this invention.

FIG. 6 is a block diagram showing still another embodiment of this invention. In the figure, indicated by 17 is a set of circuit data stored in advance in each of the network terminating equipments 1a–1n, and 18 is a random number generator which generates a random number used to select one of circuit data 15.

Next, the operation will be explained. At the occurrence of a time event for altering the scramble/descramble circuits, the network terminating equipment operates on the random number generator 18 to generate a random number thereby to select one of circuit data 17, and the selected data is delivered to the control circuit 15. The control circuit 15 produces a control signal in accordance with the circuit data and supplies the signal to the programmable logic means 14. The circuit data is also sent to the terminal equipment 2 together with other data, and the circuit data separated by the transmission path interface circuit 21 is fed to the control circuit 25. The control circuit 25 produces a control signal in accordance with the circuit data and supplies the signal to the programmable logic means 24.

The programmable logic means 14 and 24 form scramble/descramble circuits in correspondence to the control signals. The subsequent operation is identical to the preceding embodiments.

The random number generator and circuit data may also be possessed by the terminal equipment 2, in addition to the network terminating equipments 1a–1n.

Although the foregoing embodiments are the case of application to the optical subscriber transmission system of PDS system, the present invention is also applicable to transmission systems of ring bus configuration and the same effectiveness as of these embodiments can be achieved.

According to the present invention, as described above, the secret communication apparatus is designed such that programmable logic means is instructed to form scramble/descramble circuits of one of multiple types in accordance with circuit data received from the partner of communication, or specified by an external device, or held within the self equipment so that the scramble/descramble circuits formed by the programmable logic means can be altered at a prescribed time interval, whereby the leakage of communication message and data to the third party can surely be prevented.

What is claimed is:

1. A secured communication apparatus having scramble/descramble circuits which encrypt transmission data, transfer the encrypted data to a transmission path interface circuit, and decrypt data received by said transmission path interface circuit thereby to restore original data, wherein said scramble/descramble circuits are formed by programmable logic means capable of forming scramble/descramble circuits of different ones of multiple kinds, each of said different ones of multiple kinds of scramble/descramble circuits having different scramble/descramble circuit characteristics, and wherein said apparatus further includes a control circuit which includes means for instructing said programmable logic means to alter the scramble/descramble circuits to form said different ones of said multiple kinds of scramble/descramble circuits in response to selected control parameters in the course of the operation of said apparatus.

2. A secured communication apparatus according to claim 1, wherein said control circuit includes means for instructing said programmable logic means to alter the scramble/descramble circuits in accordance with circuit data received from the partner of communication.

3. A secured communication apparatus according to claim 1, wherein said control circuit includes means for instructing said programmable logic means to alter the scramble/descramble circuits in accordance with circuit data provided by an external device.

4. A secured communication apparatus according to claim 1, wherein said control circuit includes means for instructing said programmable logic means to alter the scramble/descramble circuits in accordance with circuit data held within said apparatus.

5. A secured communication apparatus according to claim 4, wherein said apparatus further includes a random number generator, and wherein said control circuit includes means for instructing said programmable logic means to form scramble/descramble circuits of a type determined from circuit data which is specified in response to a random number that is generated at the timing of instruction of circuit alteration issued to said programmable logic means.

* * * * *

UNITED STATES PATENT AND TRADEMARK OFFICE
CERTIFICATE OF CORRECTION

PATENT NO. : 5,239,581
DATED : August 24, 1993
INVENTOR(S) : T. Hane

It is certified that error appears in the above-indentified patent and that said Letters Patent is hereby corrected as shown below:

Col. 3, line 48, after "C" insert --47--.

Signed and Sealed this

Fifth Day of April, 1994

*Attest:*

BRUCE LEHMAN

*Attesting Officer*     *Commissioner of Patents and Trademarks*